Jan. 1, 1957 G. O. CROWTHER 2,776,400
VOLTAGE STABILIZER CIRCUIT ARRANGEMENT
Filed Feb. 26 1954

*INVENTOR*
GERALD OFFLEY CROWTHER

BY *Fred M. Vogel*

*AGENT*

United States Patent Office

2,776,400
Patented Jan. 1, 1957

2,776,400
VOLTAGE STABILIZER CIRCUIT ARRANGEMENT

Gerald Offley Crowther, New Malden, England, assignor to Hartford National Bank and Trust Company, Hartford, Conn., as trustee Application February 26, 1954, Serial No. 412,777

Claims priority, application Great Britain May 8, 1953

5 Claims. (Cl. 323—22)

This invention relates to voltage stabilizer circuit arrangements which produce a stabilized substantial D. C. voltage output with varying loads and input voltages. Such circuit arrangements may be used for example for supplying cathode ray tubes, Geiger-Müller tubes and the like.

An object of the invention is to provide an improved voltage stabilizer circuit arrangement. Voltage stabilizer circuits of a like nature are also described and claimed in our copending applications Serial No. 412,010, filed February 23, 1954, and Serial No. 412,778, filed February 26, 1954.

According to the present invention, a voltage stabilizer circuit arrangement comprises a cold cathode trigger-controlled gas discharge tube, the anode of which is connected, via a series resistor, to the first of a pair of input terminals and the cathode of which is connected to the first of a pair of output terminals, a reservoir capacitor being connected between said pair of output terminals, a second capacitor being connected between the anode of said tube and one or other pole of said reservoir capacitor and means for connection of a voltage reference source between the trigger electrode of said tube and the second terminal of the pair of output terminals.

The voltage reference source may comprise a second cold cathode trigger-controlled gas discharge tube.

Figure 1:
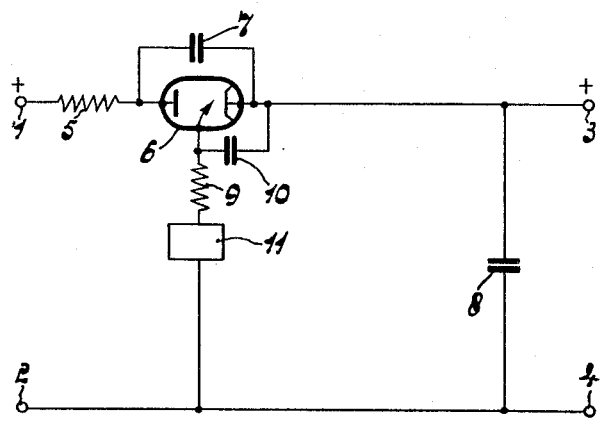
Figure 2:
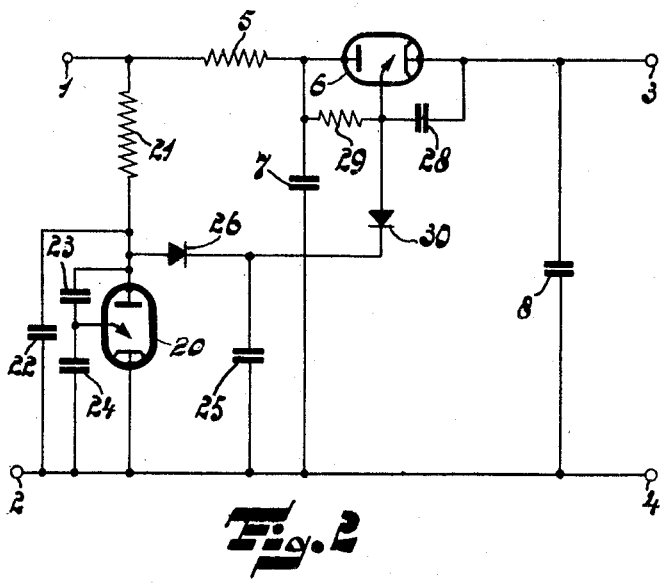

In order that the invention may be readily carried into effect, two embodiments will now be described with reference by way of example to the accompanying drawings in which:

Fig. 1 is a schematic diagram of an embodiment of the circuit arrangement of the present invention; and Fig. 2 is a schematic diagram of another embodiment of the circuit arrangement of the present invention.

Referring to Figure 1, the circuit arrangement has input terminals 1, 2 and output terminals 3, 4. Input terminals 1, 2 are for connection to a D. C. source (not shown) having a voltage in excess of the desired stabilized voltage, while output terminals 3, 4 are for connection to a load. A reservoir capacitor 8 is connected between terminals 3 and 4. Connected in series between input terminal 1 and output terminal 3 are a resistor 5 and a cold cathode trigger-controlled gas discharge tube 6. Between the anode of tube 6 and the positive pole of reservoir capacitor 8, i. e. in parallel with tube 6, is connected a capacitor 7.

The trigger electrode of tube 6 is connected via a resistor 9 to a voltage reference source 11. Between the trigger electrode and the cathode of tube 6 there is connected a capacitor 10. The time constant of resistor 9 and capacitor 10, plus the time constant of the source 11, should preferably be greater than that of resistor 5 and capacitor 7, but less than that of capacitor 8 and the load to be connected across terminals 3, 4.

The circuit arrangement may be said to operate as follows:

Assuming that the required D. C. voltage is connected to terminals 1, 2 and that a load is connected to terminals 3, 4, the reservoir capacitor 8 will initially charge via tube 6 until the said tube extinguishes itself because the voltage of the cathode of the said tube has risen until the voltage between anode and cathode is insufficient to maintain a discharge.

Tube 6 is now extinguished and capacitor 7 charges via resistor 5 and reservoir capacitor 8. Thus the voltage across reservoir capacitor 8 rises; the voltage rise across reservoir capacitor 8 during the charging of capacitor 7 being proportional to the ratio of capacitor 7 and reservoir capacitor 8.

Due to the load, reservoir capacitor 8 is slowly discharging and the voltage of the cathode is falling. The voltage of the trigger electrode is held constant by the voltage reference source 11 and the cathode voltage falls until the trigger ignition potential exists between the trigger electrode and the cathode. Thereupon tube 6 ignites and discharges capacitor 7 until the voltage between anode and cathode becomes insufficient to support a discharge in the said tube and the said tube extinguishes itself. Capacitor 7 then charges again and thereby a further charge is supplied to reservoir capacitor 8 which raises the cathode voltage again.

While tube 6 is ignited the trigger electrode voltage tends to approach the cathode voltage due to current in the trigger electrode. Thus when tube 6 is extinguished the trigger electrode voltage again assumes the reference voltage of source 11 under the influence of the time constant of resistor 9 and capacitor 10. It is desirable that the capacitor 7 and, of course, reservoir capacitor 8, have received most of their charges before the trigger electrode voltage is approximately that of the reference voltage; otherwise tube 6 may ignite prematurely before the cathode voltage has an opportunity to rise due to the charging. This may be avoided by suitably arranging the value of the time constant of resistor 9 and capacitor 10.

The cycle of discharge and charge repeats itself with a frequency which depends on how often the cathode of tube 6 falls to the value which ignites the said tube. This in turn is dependent upon the load and the input voltage to the circuit arrangement.

Thus if the load increases and/or the input voltage to the circuit arrangement falls, the frequency of operation of tube 6 increases, whereas if the load decreases or the input voltage rises, the frequency of operation of tube 6 decreases and thereby a substantially constant D. C. output voltage having a slight ripple voltage of known amplitude, is obtained. This ripple voltage may be smoothed out in known manner.

Figure 2 shows a circuit arrangement in which the voltage reference source takes the form of a circuit arrangement comprising a second cold cathode trigger-controlled gas discharge tube 20 and in which the capacitor 7 is connected in an alternative position.

Briefly, the voltage reference source comprises a tube 20 the anode of which is connected to terminal 1 via a resistor 21. The anode of tube 20 is connected to the cathode via a capacitor 22 which has connected in parallel with it a potentiometer comprising capacitor 23 and 24, the junction point of which is connected to the trigger electrode of the tube 20. The anode of tube 20 is further connected to a capacitor 25 via a rectifier 26.

The capacitors 22, 23 and 24 charge through resistor 21 until the proportion of the voltage supplied to the trigger electrode reaches the trigger electrode ignition voltage, whereupon tube 20 ignites and discharges the capacitors 22, 23 and 24 to a value such that the said tube extinguishes itself. Thus sawtooth oscillations are produced at the anode of tube 20 which are of constant amplitude which is determined by the extinction potential of the said tube 20 and by the ratio of capacitors 23 and 24 in conjunction with the trigger electrode ignition potential.

The constant amplitude oscillations peak charge capacitor 25 in the presence of a very light load via rectifier 26. Thus a substantially constant voltage is developed across capacitor 25.

Between anode and cathode of tube 6 is connected a resistor 29 and a capacitor 28, the junction point between the two being connected to the trigger electrode of the said tube. The trigger electrode of tube 6 is connected to capacitor 25 via a rectifier 30.

The circuit arrangement of Figure 2 also differs from that of Figure 1 in that capacior 7, instead of being connected between the anode of tube 6 and the positive pole of capacitor 8, is connected in an alternative position, i. e. between the anode of tube 6 and the negative pole of capacitor 8.

The operation of the circuit arrangement shown in Figure 2 differs slightly from that described in connection with Figure 1, in that, instead of the reservoir capacitor 8 receiving its increment of charge during the charging of capacitor 7, capacitor 8 now receives its increment when capacitor 7 discharges via tube 6 during conduction of that tube. Thus the increment is supplied almost instantaneously to reservoir capacitor 8, and therefore the only consideration affecting the choice of the time constant of the trigger electrode circuit is the extinction of the trigger discharge, provided, of course, that relatively it is not too large. When capacitor 7 is being discharged capacitor 28 is also discharged by trigger electrode current, thereby causing the trigger electrode to approach the cathode in voltage. The rectifier 30 prevents the trigger electrode from becoming a heavy load on the voltage reference source when its voltage is less than that of the upper electrode of capacitor 25. After the extinction of the tube 6 the trigger electrode is again raised in voltage relative to the cathode due to capacitor 28 and resistor 29 until rectifier 30 conducts and holds the trigger electrode at the voltage of the reference source.

Other reference voltage sources may very well be used, which sources may include a battery or other known circuits using hard or soft tubes.

While the invention has been described by means of specific examples and in specific embodiments, I do not wish to be limited thereto, for obvious modifications will occur to those skilled in the art without departing from the spirit and scope of the invention.

What is claimed is:

1. A voltage stabilizer circuit arrangement comprising a cold cathode trigger-controlled gas discharge tube, the anode of which is connected via a series resistor to the first of a pair of input terminals and the cathode of which is connected to the first of a pair of output terminals, a reservoir capacitor having two terminal conductors connected between said pair of output terminals, a second capacitor being connected between the anode of said tube and one of the terminal conductors of said reservoir capacitor and means being provided for connection of a voltage reference source between the trigger electrode of said tube and the second terminal of the pair of output terminals.

2. A voltage stabilizer circuit arrangement as claimed in claim 1, wherein said second capacitor is connected between the anode of the tube and the negative terminal conductor of the reservoir capacitor.

3. A voltage stabilizer circuit arrangement as claimed in claim 1, wherein a voltage reference source comprising a second cold cathode trigger-controlled gas discharge tube is connected to said means.

4. A voltage stabilizer circuit arrangement as claimed in claim 3, wherein said second capacitor is connected between the anode of the first tube and the positive terminal conductor of the reservoir capacitor and wherein the time constant of said means and of said voltage reference source taken together is greater than the time constant of said series resistor and the second capacitor but less than that of the load together with the reservoir capacitor.

5. A voltage stabilizer circuit arrangement as claimed in claim 1, wherein said means comprises a series combination of a third resistor and a third capacitor connected in that order between anode and cathode of the first tube, the junction point of the third resistor and the third capacitor being connected to the trigger electrode and to one terminal of a rectifier in such a manner that when the other terminal of the rectifier is connected to a voltage reference source the trigger electrode voltage is prevented from becoming substantially more positive than the voltage of the source.

No references cited.